United States Patent [19]
Kim

[11] Patent Number: 5,398,222
[45] Date of Patent: Mar. 14, 1995

[54] METHOD AND APPARATUS OF MEASURING SEEK TIME USING OPTICAL DISK APPARATUS

[75] Inventor: Won M. Kim, Seoul, Rep. of Korea

[73] Assignee: Hyundai Electronics Industries Co., Ltd., Kyungki-do, Rep. of Korea

[21] Appl. No.: 167,076

[22] Filed: Dec. 15, 1993

[30] Foreign Application Priority Data

Dec. 23, 1992 [KR] Rep. of Korea .................. 9225208

[51] Int. Cl.[6] .................................... G11B 17/22
[52] U.S. Cl. ................................ 369/32; 369/44.28
[58] Field of Search ............ 369/32, 13, 44.28, 44.34, 369/44.35, 44.29, 44.26, 44.27, 44.32, 44.11, 44.33, 48, 47, 58, 59, 54, 33, 275.3, 116; 360/114, 59, 78.04, 78.01, 78.06, 78.07

[56] References Cited

U.S. PATENT DOCUMENTS

5,063,545 11/1991 Nishida .................................. 369/32
5,189,650 2/1993 Watanabe et al. ..................... 369/13

Primary Examiner—Ali Neyzari
Attorney, Agent, or Firm—Foley & Lardner

[57] ABSTRACT

A magneto-optical disk apparatus and a method of measuring seek time using it. The method comprises the steps of allowing a host system to generate a seek instruction, calculating instruction time, transferring the seek instruction from the host system to the optical disk apparatus, driving a timer of the host system to start a counting operation of the timer and setting a count of the timer at that time as a seek start time, generating an interrupt signal to the timer in the host system to stop the counting operation of the timer if an optical head reaches accurately a desired target track on an optical disk for a predetermined time period and setting a count of the timer at that time as a seek stop time, obtaining the seek time by subtracting the seek start time, latency time per ½ revolution of the optical disk and the instruction time from the seek stop time, and sending an error message code to the host system to notify the host system of a failure in an seek operation if the optical head does not reach accurately the target track for the predetermined time period.

3 Claims, 6 Drawing Sheets

IOT  6T  6T  I4T   6T    6T  6T  IOT  5T

|←-------- SECTOR MARK --------→|

Fig - 6

METHOD AND APPARATUS OF MEASURING SEEK TIME USING OPTICAL DISK APPARATUS

BACKGROUND OF THE INVENTION

1. Field of the Invention

The present invention relates to an optical disk apparatus and a method of measuring seek time using it in which the seek time required in shifting an optical head to a desired target track on an optical disk in the optical disk apparatus such as an optical disk drive (ODD) is measured on a screen of a host system using the optical disk apparatus with no use of an auxiliary measurement equipment.

2. Description of the Prior Art.

Generally, in conventional methods of measuring seek time required in shifting an optical head to a desired target track on an optical disk in a device such as an ODD, an electrical signal from the device is applied to a particular measurement equipment for analysis and the seek time is calculated based on the analyzed electrical signal. In such a conventional seek time measuring method, a separate software is required to confirm whether the optical head has been shifted to the desired target track on the optical disk. After the confirmation, the actual seek time must be calculated based on the electrical signal from the device applied to the measurement equipment. In this case, there may be present an error in a hardware of the device for generating the electrical signal. This results in a reduction in the reliability in measuring the seek time. Also, the use of the particular measurement equipment results in an inconvenience in measuring the seek time.

Figure 1:
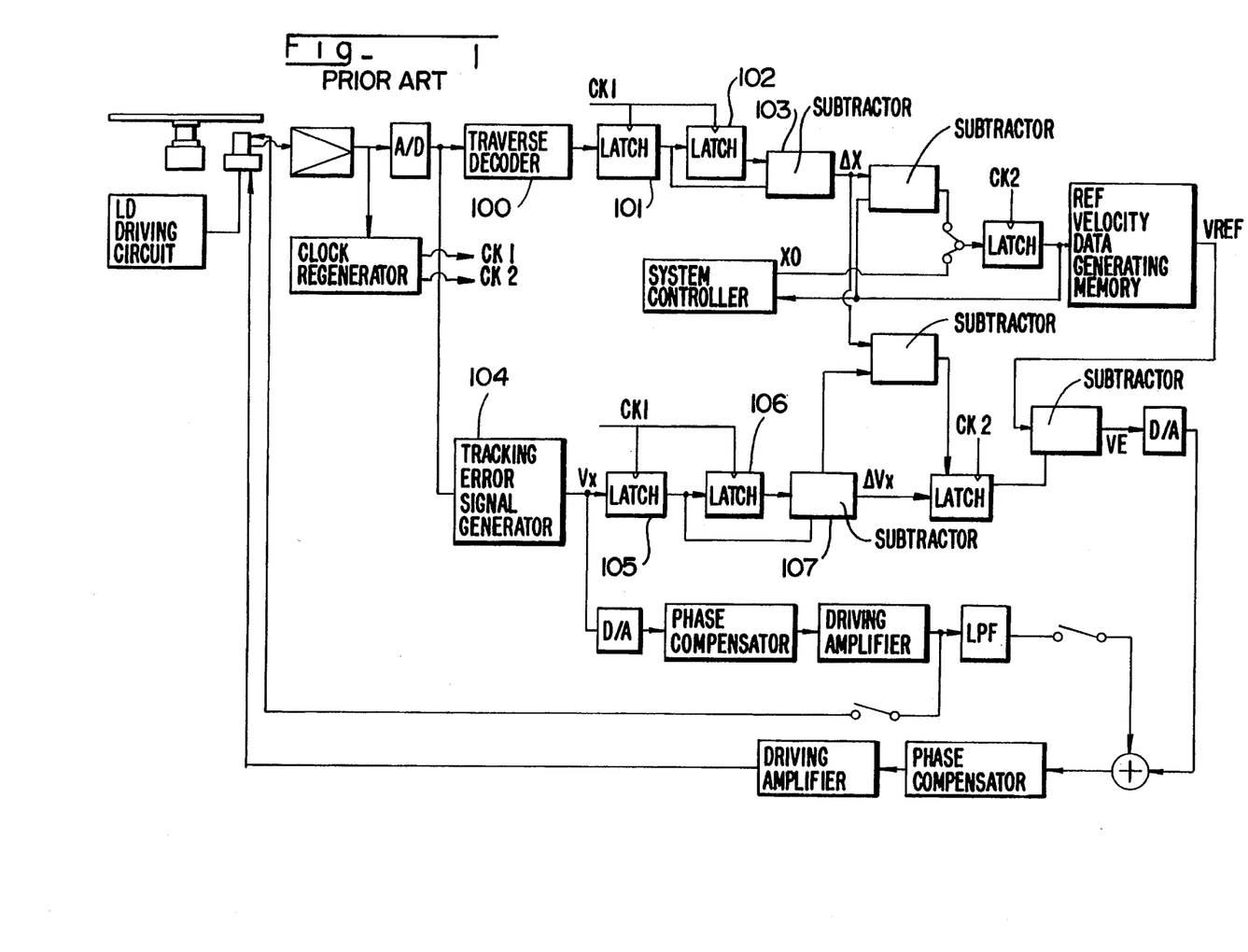
FIG. 1 is a block diagram of a conventional apparatus for detecting a speed at which an optical head accesses a target track on an optical disk.

An apparatus for detecting a speed at which the optical head accesses the target track on the optical disk is disclosed in U.S. Pat. No. 5,063,545 and shown in a block form in FIG. 1, herein. This access speed detecting apparatus comprises traverse data detection means 100 for detecting traverse data read by the optical head to produce traverse data signals, first speed data forming means 101-103 for detecting deviations in the traverse data signals produced by the traverse data detection means at predetermined time intervals for forming M upper order data bits representing the access speed, tracking error means 104 for producing tracking error data signals, and second speed data forming means 105-107 for detecting deviations in the tracking error data signals produced by the tracking error means for forming N lower order data bits representing the access speed. However, the above-mentioned access speed detecting apparatus does not propose a technique for measuring the seek time required in shifting the optical head to the desired target track on the optical disk.

SUMMARY OF THE INVENTION

Therefore, the present invention has been made in view of the above problems, and it is an object of the present invention to provide an optical disk apparatus and a method of measuring seek time using it in which a sector mark is detected by reproduction of a header information signal in the optical or photo-magnetic disk apparatus and an interrupt signal from a microcontroller in the optical disk apparatus is applied to a timer in a host system upon detection of the sector mark, so that the seek time required in shifting an optical head to a desired target track on an optical disk is measured based on instruction time from the host system using the timer in the host system with no use of a separate measurement equipment.

In accordance with one aspect of the present invention, there is provided an optical disk apparatus comprising a semi-conductor laser for emitting a light beam; a parallel circular collimator lens for collimating the light beam from said semi-conductor laser into a parallel circular light beam; a first beam splitter for transmitting the parallel circular light beam collimated by said parallel circular collimator lens and reflecting a light beam from an optical disk; a reflection mirror for reflecting the light beam transmitted by said first beam splitter to change a path thereof; an objective lens for forming a fine focus of the light beam reflected by said reflection mirror on the optical disk; a magnetic coil for generating a magnetic field based on a current flow therethrough to perform recording/erasing of information on the optical disk; a focusing lens for adjusting a focusing distance of the light beam reflected by said first beam splitter; a second beam splitter for transmitting and reflecting the resultant light beam from said focusing lens; first beam detection means for detecting the light beam reflected by said second beam splitter and converting the detected light beam into a current signal; second beam detection means for detecting the light beam transmitted by said second beam splitter and converting the detected light beam into a current signal; current/voltage conversion means for converting the current signals from said first and second beam detection means into voltage signals; low pass filtering means for filtering the voltage signals from said current/voltage conversion means to remove high frequency components therefrom; data signal separation means for separating a feedback signal and data signals from the resultant voltage signals from said low pass filtering means; optical head control means for controlling an optical head driver in response to the feedback signal from said data signal separation means, said optical head driver driving an optical head under the control of said optical head control means; signal processing means for processing the data signals from said data signal separation means; and interface means for transferring the processed signals from said signal processing means to a host system and said optical head control means and transferring instructions and control signals from said host system to said signal processing means.

In accordance with another aspect of the present invention, there is provided a method of measuring seek time using an optical disk apparatus, comprising the steps of (a) allowing a host system to generate a seek instruction to measure the seek time required in shifting an optical head to a desired target track on an optical disk; (b) calculating instruction time before the seek instruction from said host system is transferred to the optical disk apparatus; (c) transferring the seek instruction from said host system to the optical disk apparatus after calculation of the instruction time; (d) driving a timer of said host system to start a counting operation of the timer and setting a count of the timer at that time as a seek start time; (e) outputting a digital optical head control signal to an optical head controller in the optical disk apparatus in response to the seek instruction from said host system for execution of a seek function of the optical head; (f) driving said optical head controller to convert the digital optical head control signal into an analog signal for driving an optical head driver in the optical disk apparatus; (g) driving said optical head driver in response to the analog signal from said optical head controller to shift the optical head to the target track on the optical disk; (h) reading a number of the shifted track on the optical disk after shifting the optical head to the target track and checking whether the read track number is the same as that of the target track; (i) continuing to drive said optical head controller to repeatedly perform an error correction operation until the optical head reaches accurately the target track; (j) checking whether the optical head reaches accurately the target track for a predetermined time period; (k) generating an interrupt signal to said timer in said host system to stop the counting operation of said timer if it is checked at said step (j) that the optical head reaches accurately the target track for the predetermined time period and setting a count of said timer at that time as a seek stop time; (l) obtaining the seek time by subtracting the seek start time set at said step (d), latency time per ½ revolution of the optical disk and the instruction time calculated at said step (b) from the seek stop time set at said step (k); and (m) sending an error message code to said host system to notify said host system of a failure in the seek operation if it is checked at said step (j) that the optical head does not reach accurately the target track for the predetermined time period.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 2:
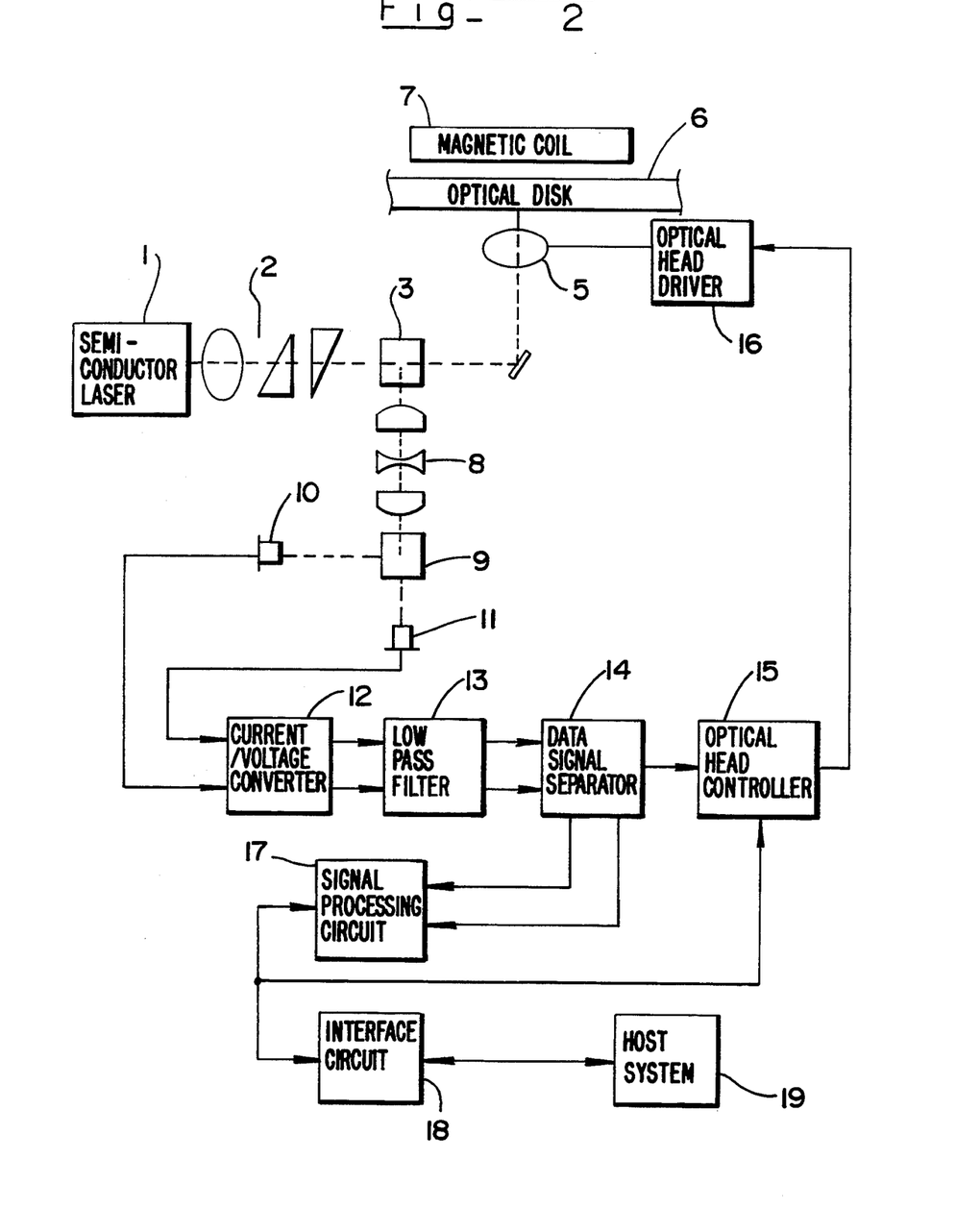
FIG. 2 is a block diagram of an optical disk apparatus in accordance with the present invention.

Referring to FIG. 2, there is shown a block diagram of an optical disk apparatus in accordance with the present invention. As shown in this drawing, the optical disk apparatus comprises a semi-conductor laser 1 for emitting a light beam, a parallel circular collimator lens 2 for collimating the light beam from the semi-conductor laser 1 into a parallel circular light beam, a beam splitter 3 for transmitting the parallel circular light beam collimated by the parallel circular collimator lens 2 and reflecting a light beam from an optical disk 6, a reflection mirror 4 for reflecting the light, beam transmitted by the beam splitter 3 to change a path thereof, and an objective lens 5 for forming a fine focus of the light beam reflected by the reflection mirror 4 on the optical disk 6.

A magnetic coil 7 is provided in the optical disk apparatus to generate a magnetic field based on a current flow therethrough to perform recording/erasing of information on the optical disk 6.

A focusing lens 8 is also provided in the optical disk apparatus to adjust a focusing distance of the light beam reflected by the beam splitter 3.

A ½ wavelength plane polarizing beam splitter 9 is also provided in the optical disk apparatus to transmit and reflect the resultant light beam from the focusing lens 8.

The optical disk apparatus also comprises a beam detector 10 for detecting the light beam reflected by the ½ wavelength plane polarizing beam splitter 9 and converting the detected light beam into a current signal, a beam detector 11 for detecting the light beam transmitted by the ½ wavelength plane polarizing beam splitter 9 and converting the detected light beam into a current signal, a current/voltage converter 12 for converting the current signals from the beam detectors 10 and 11 into voltage signals, a low pass filter 13 for filtering the voltage signals from the current/voltage converter 12 to remove high frequency components therefrom, a data signal separator 14 for separating a feedback signal and data signals from the resultant, voltage signals from the low pass filter 13, an optical head controller 15 for controlling an optical head driver 16 in response to the feedback signal from the data signal separator 14, a signal processing circuit. 17 for processing the data signals from the data signal separator 14, and an interface circuit 18 for transferring the processed signals from the signal processing circuit 17 to a host system 19 and the optical head controller 15 and transferring instructions and control signals from the host system 19 to the signal processing circuit 17.

Figure 3:
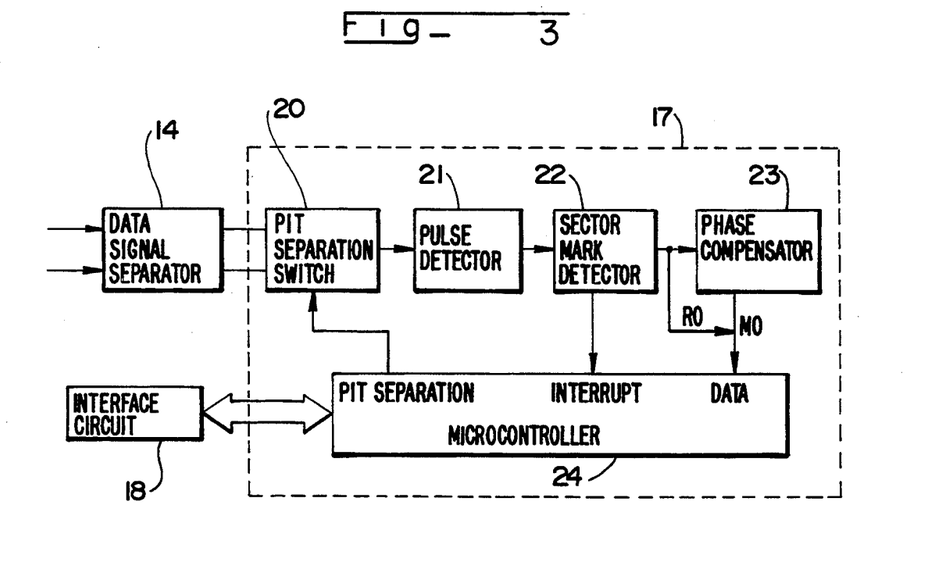
FIG. 3 is a detailed block diagram of a signal processing circuit in the optical disk apparatus in FIG. 2.

Referring to FIG. 3, there is shown a detailed block diagram of the signal processing circuit 17 in the optical disk apparatus in FIG. 2. As shown in this figure, the signal processing circuit 17 includes a pit separation switch 20 for separating header information pits and data information pits from the data signals from the data signal separator 14 and outputting the resultant analog header information signal or data information signal, a pulse detector 21 for converting the analog header information signal or data information signal from the pit separation switch 20 into a digital signal, a sector mark detector 22 for detecting a sector mark from the digital header information signal from the pulse detector 21 to output a sector mark detect signal, a phase compensator 23 for compensating for a phase of the digital data information signal from the pulse detector 21 for synchronization with the digital header information signal outputted from the sector mark detector 22, and a microcontroller 24 for decoding the digital header information signal from the sector mark detect or 22 and the digital data information signal from the phase compensator 23 and controlling the pit separation switch 20 in response to the sector mark detect signal from the sector mark detector 22.

The operation of the optical disk apparatus with the above-mentioned construction in accordance with the present invention will hereinafter be described in detail.

First, the light, beam is emitted from the semi-conductor laser 1 and collimated into the parallel circular light beam by the parallel circular collimator lens 2. The parallel circular light beam collimated by the parallel circular collimator lens 2 is transmitted by the beam splitter 3 and reflected by the reflection mirror 4. The light beam reflected by the reflection mirror 4 is applied on the optical disk 6 through the objective lens 5. As a result, the fine focus of the light beam reflected by the reflection mirror 4 is formed on the optical disk 6. The magnetic coil 7 is adapted to generate the magnetic field based on the current flow therethrough to perform recording/erasing of information on the optical disk 6.

On the other hand, the light beam is reflected by the optical disk 6 and transferred to the beam splitter 3 through the objective lens 5 and the reflection mirror 4. The beam splitter 3 reflects the transferred light beam to the focusing lens 8, which adjusts the focusing distance of the light beam reflected by the beam splitter 3. The resultant light beam from the focusing lens 8 is transmitted and reflected by the ½ wavelength plane polarizing beam splitter 9. The beam detector 10 detects the light beam reflected by the ½ wavelength plane polarizing beam splitter 9 and converts the detected light beam into the current, signal. The beam detector 11 detects the light beam transmitted by the ½ wavelength plane polarizing beam splitter 9 and converts the detected light beam into the current signal.

Here, it should be noted that the focusing lens 8 adjusts the focusing distance of the light beam reflected by the beam splitter 3 to utilize magnitudes of the light beams detected by the beam detectors 10 and 11 in a differential drive manner.

The current signals from the beam detectors 10 and 11 are converted into the voltage signals by the current/voltage converter 12 and filtered by the low pass filter 13 for removal of the high frequency components therefrom. The data signal separator 14 separates the feedback signal and the data signals from the resultant voltage signals from the low pass filter 13. In response to the separated feedback signal from the data signal separator 14, the optical head driver 16 drives an optical head such that the light beam scans tracks on the surface of the optical disk 6, with a magnitude maintained constant.

The separated data signals from the data signal separator 14 are applied to the signal processing circuit 17. The signal processing circuit 17 detects the sector mark from the data signals from the data signal separator 14. Based on the sector mark detected by the signal processing circuit 17 are calculated the whole instruction execution time of the host system 19 and the optical disk apparatus.

Generally, an information recording format on the optical disk is divided into two regions, header information and data information regions recorded in the form of pit. The header information region is a read only (RO) region which is not recordable by the user, whereas the data information region is a magneto optic (MO) region which is recordable, erasable and reproducible by the user.

In the signal processing circuit 17, the pit separation switch 20 separates the RO and MO pits from the data signals from the data signal separator 14 under the control of the microcontroller 24 which is operated in response to the sector mark detect signal from the sector mark detector 22. The sector mark detect signal from the sector mark detector 22 is applied to an interrupt terminal of the microcontroller 24. The resultant analog RO or MO signal from the pit separation switch 20 is converted into the digital signal by the pulse detector 21. The sector mark detector 22 detects the sector mark from the digital RO signal from the pulse detector 21 and applies the sector mark detect signal to the interrupt terminal of the microcontroller 24. The phase compensator 23 compensates for the phase of the digital MO signal from the pulse detector 21 for the synchronization with the digital RO signal from the sector mark detector 22 in decoding of both the signals in the microcontroller 24.

Figure 4:
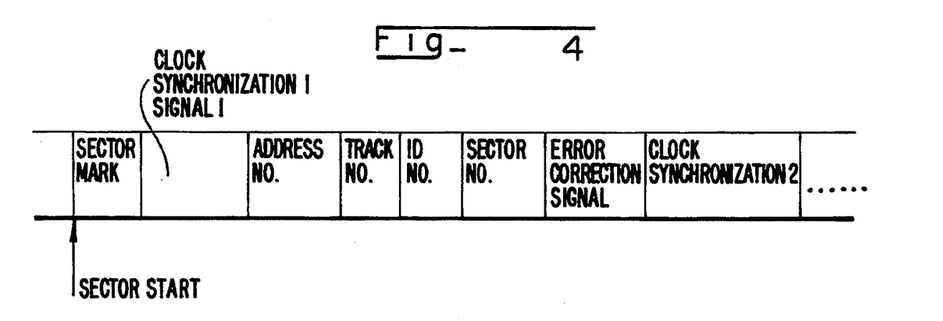
FIG. 4 is a view illustrating a data format of header information containing a sector mark which is detected by a sector mark detector in the signal processing circuit in FIG. 3.

Referring to FIG. 4, there is shown a view illustrating a data format of the header information containing the sector mark which is detected by the sector mark detector 22 in the signal processing circuit 17 in FIG. 3. As shown in this drawing, the sector mark is placed on a start point of the header information region RO which not recordable by the user and recorded in the form of pit on the optical disk. Upon detection of the sector mark on the start point of the header information region RO, the sector mark detector 22 generates the sector mark detect signal as an interrupt signal to the microcontroller 24 to notify the microcontroller 24 of the detection of the sector mark. The sector mark indicates a sector start point of the header information region RO.

Figure 5:
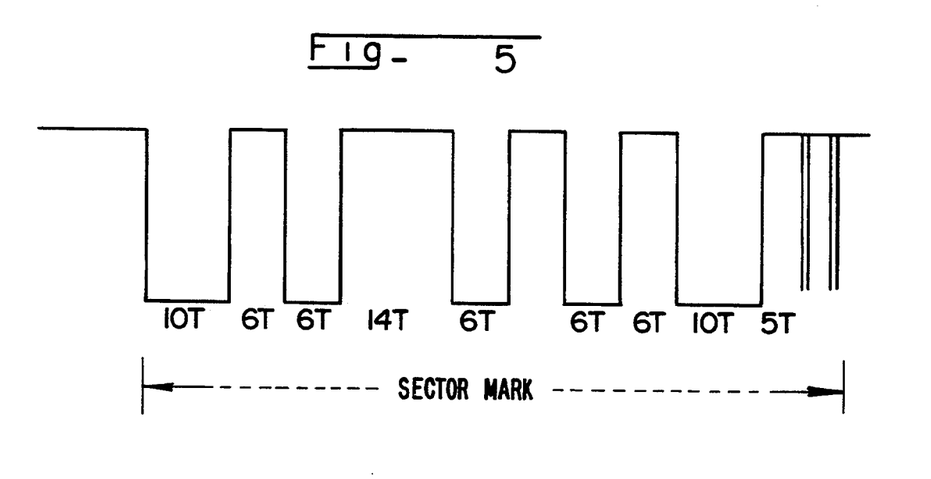
FIG. 5 is a view illustrating a pattern of the sector mark in FIG. 4.

Referring to FIG. 5, there is shown a view illustrating a pattern of the sector mark in FIG. 4. In this drawing, "T" is the number of channel bits which is the minimum recordable unit per sector and "2T" corresponds to a one byte.

Figure 6:
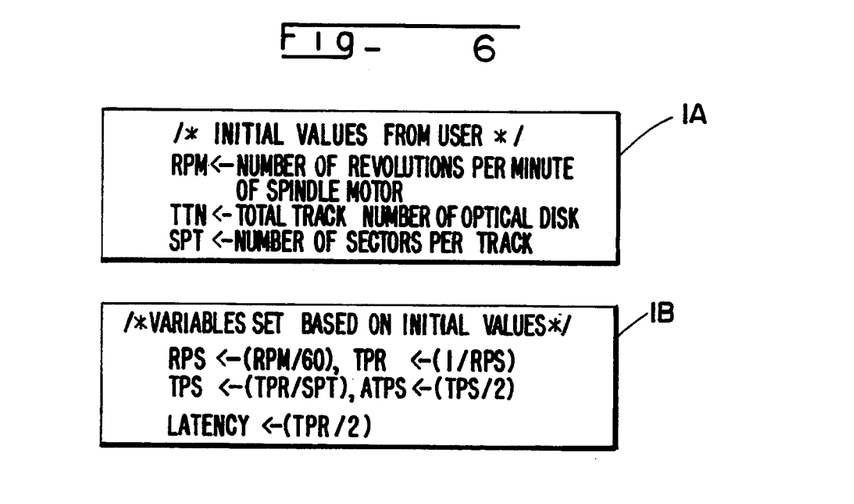
FIG. 6 is a block diagram illustrating an initialization algorithm of setting initial values on the basis of input values from the user in accordance with the present invention.

Referring to FIG. 6, there is shown a block diagram illustrating an initialization algorithm of setting initial values on the basis of input, values from the user in accordance with the present invention. As shown in this figure, the initialization algorithm comprises the user input step 1A in which the host system 19 inputs values RPM, TTN and SPT regarding a characteristic of the optical disk apparatus and a format of the optical disk 6 from the user and the initialization step 1B in which the host system 19 sets global variables RPS, TPR, TPS, ATPS and LATENCY for calculation of seek time on the basis of the input values from the user regardless of the optical disk apparatus characteristic and the optical disk format.

In the user input step 1A, the value RPM is the number of revolutions per minute of a spindle motor (not shown) of the optical disk apparatus for rotating the optical disk 6, the value TTN is the total tracks number of the optical disk 6 and the value SPT is the number of sectors per track of the optical disk 6. In the initialization step 1B, the variable RPS is the number of revolutions per second of the spindle motor, the variable TPR is time per revolution of the spindle motor, the variable TPS is time per sector of the optical disk 6, the variable ATPS is average time per sector of the optical disk and the variable LATENCY is latency time per ½ revolution of the spindle motor.

Figure 7:
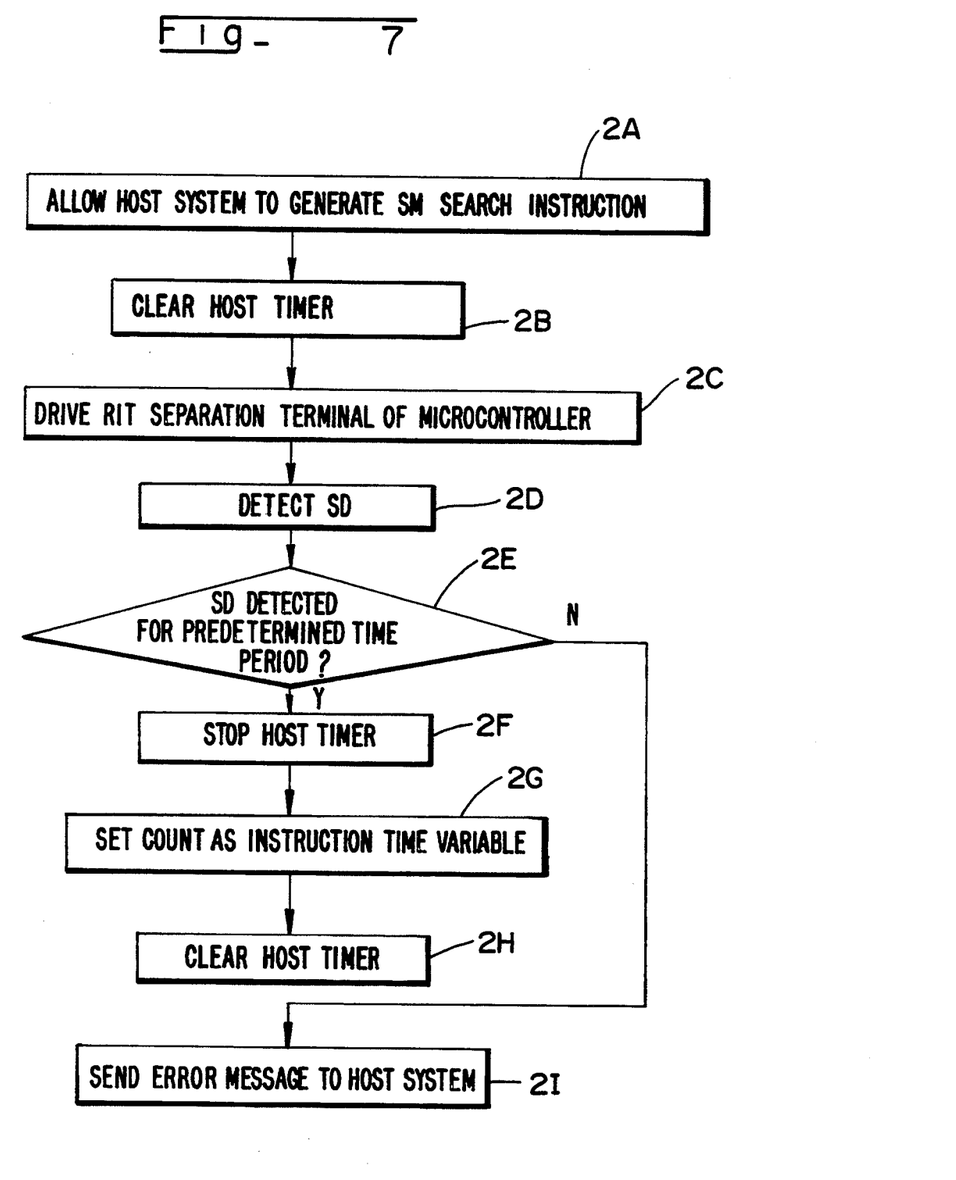
FIG. 7 is a flowchart illustrating an operation of measuring instruction execution time in accordance with the present invention.

Referring to FIG. 7, there is shown a flowchart illustrating an operation of measuring the whole instruction execution time of the host system 19 and the optical disk apparatus in accordance with the present invention. First, the host system 19 instructs the signal processing circuit 17 to search for the sector mark (SM) as shown in FIGS. 4 and 5 at the step 2A. An internal timer (not shown) of the host system 19 is cleared to get ready to count the SM search instruction execution time at the moment that the SM search instruction is executed at the step 2B.

After the internal timer is cleared, at the step 2C, the host system 19 transmits a control signal to the microcontroller 24 in the signal processing circuit 17 through the interface circuit 18 to drive a pit separation terminal of the microcontroller 24, thereby causing the pit separation switch 20 in the signal processing circuit 17 to separate the RO and MO pits from the data signals from the data signal separator 14. In the signal processing circuit 17, the resultant analog RO or MO signal from the pit separation switch 20 is converted into the digital signal by the pulse detector 21. The sector mark detector 22 detects the sector mark of the pattern as shown in FIG. 5 from the digital signal from the pulse detector 21 and applies the sector mark detect signal to the interrupt terminal of the microcontroller 24 at the step 2D.

At the step 2E, the microcontroller 24 checks in response to the interrupt signal from the sector mark detector 22 whether the sector mark is detected for a predetermined time period or a constant multiple of the variable LATENCY at the initialization step 1B in FIG. 6. Therefore, the damage of the RO information region and the reliability of the optical disk 6 can be checked.

If it is checked at the step 2E that the sector mark is not detected for the predetermined time period, the microcontroller 24 recognizes presence of an error and sends an error message code to the host system 19 through the interface circuit 18 at the step 2I. As a result, the operation is ended. On the contrary, if it is checked at the step 2E that the sector mark is detected for the predetermined time period, the microcontroller 24 generates an interrupt signal to the timer in the host system 19 to stop the counting operation of the timer at the step 2F. A count of the timer at that time is set as an instruction time variable at the step 2G and the timer is cleared at the step 2H. In this manner, the whole instruction execution time of the host system 19 and the optical disk apparatus is set as the instruction time variable.

Figure 8:
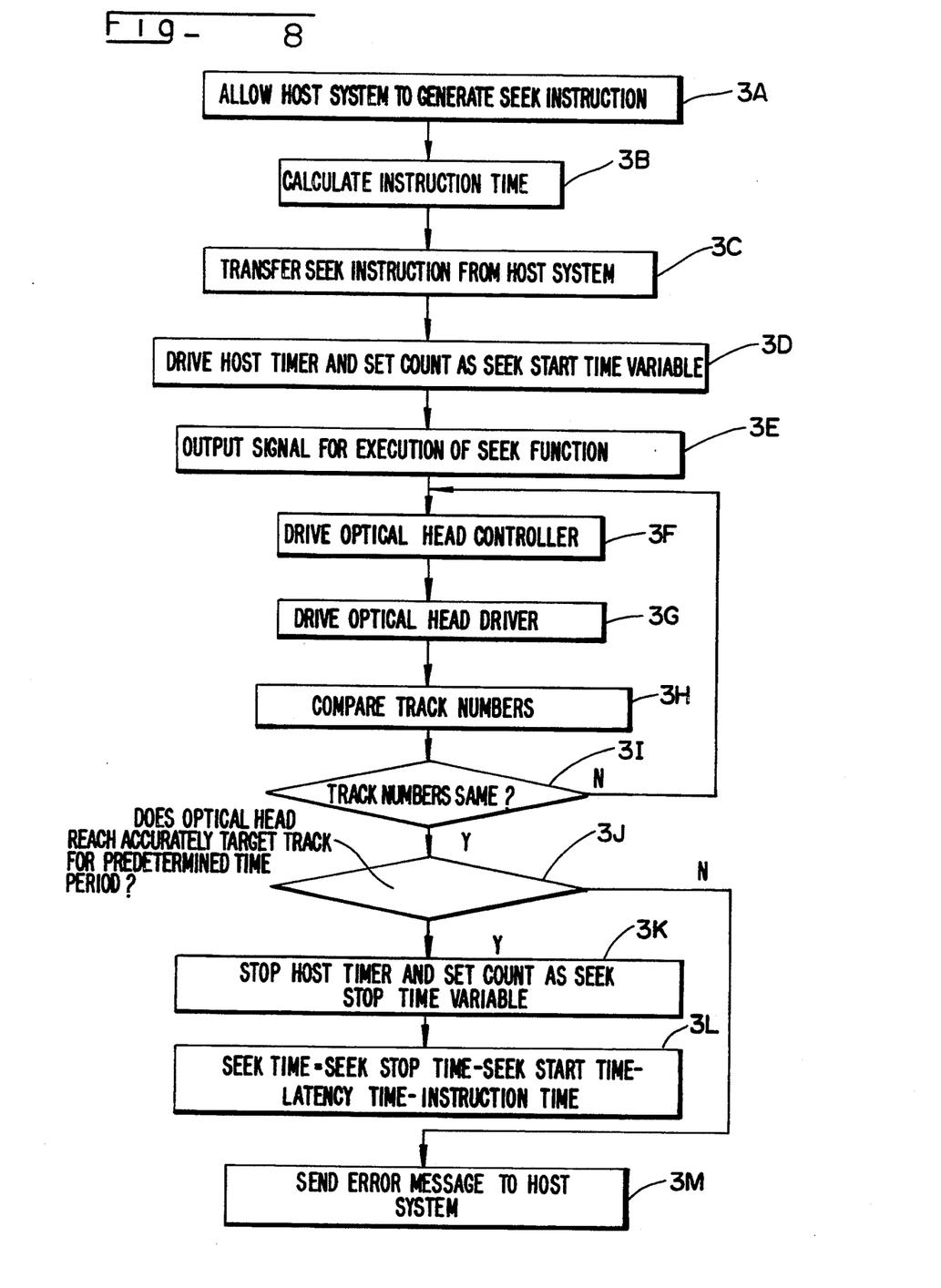
FIG. 8 is a flowchart illustrating a method of measuring seek time on a screen of a host system in accordance with the present invention.

Referring to FIG. 8, there is shown a flowchart illustrating a method of measuring the seek time required in shifting the optical head to a desired target track on the optical disk 6 in accordance with the present invention. The seek time is obtained by subtracting the latency time per ½ revolution of the spindle motor from access time required in accessing the target track or sector.

First, upon generation of a seek instruction from the host system 19 at the step 3A, the instruction time or the whole instruction execution time of the host system 19 and the optical disk apparatus is calculated as shown in FIG. 7 at the step 3B before the seek instruction from the host system 19 is transferred to the microcontroller 24 in the signal processing circuit 17 through the interface circuit 18.

Then, the seek instruction from the host system 19 is transferred to the microcontroller 24 in the signal processing circuit 17 through the interface circuit 18 at the step 3C. After the transfer of the seek instruction to the microcontroller 24, at the step 3D, the host system 19 drives the timer to start the counting operation of the timer and sets a count of the timer at that time as a seek start time variable.

At the step 3E, the microcontroller 24 applies a digital optical head control signal to the optical head controller 15 in response to the seek instruction from the host, system 19 for execution of a seek function of the optical head. The optical head controller 15 is driven to convert the digital signal from the microcontroller 24 into an analog signal for driving the optical head driver 16 at the step 3F. The optical head driver 16 is driven in response to the analog signal from the optical head controller 15 to shift the optical head to the target track on the optical disk 6 at the step 3G. After the optical head is shifted, at the step 3H, the microcontroller 24 reads a number of the shifted track on the optical disk 6 and checks whether the read track number is the same as that of the target track, in order to check the reliability of the seek operation.

The microcontroller 24 continues to drive the optical head controller 15 to repeatedly perform an error correction operation until the optical head reaches accurately the target track, at the step 3I. Then, at the step 3J, the microcontroller 24 checks whether the optical head reaches accurately the target track for the predetermined time period or the constant multiple of the variable LATENCY at the initialization step 1B in FIG. 6. If it is checked at the step 3J that the optical head does not reach accurately the target track for the predetermined time period, the microcontroller 24 sends the error message code to the host system 19 through the interface circuit 18 to notify the host system 19 of a failure in the seek operation at the step 3M.

On the contrary, if it is checked at the step 3J that the optical head reaches accurately the target track for the predetermined time period, the microcontroller 24 generates the interrupt signal to the timer in the host system 19 to stop the counting operation of the timer at the step 3K. A count of the timer at that time is set as a seek stop time variable. At the step 3L, the seek time is obtained by subtracting the latency time per ½ revolution of the spindle motor and the instruction time from the whole seek operation execution time obtained by subtracting the seek start time from the seek stop time. Namely, the seek time can be expressed by the following equation:

SEEK TIME=SEEK STOP TIME−SEEK START TIME−LATENCY TIME−INSTRUCTION TIME

As apparent from the above description, according to the present invention, the seek time can be measured on a screen of the host system regardless of the hardware circuitry of the host system and optical disk apparatus and the disk format such as the number of sectors per track, the total tracks number and etc. The measurement of the seek time has the effect of checking the reliability of the optical disk apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A magneto-optical disk apparatus for measuring seek time comprising:
   a semi-conductor laser for emitting a light beam;
   a parallel circular collimator lens for collimating the light beam from said semi-conductor laser into a parallel circular light beam;
   a first beam splitter for transmitting the parallel circular light beam collimated by said parallel circular collimator lens and reflecting a light beam from a magneto-optical disk;

a reflection mirror for reflecting the light beam transmitted by said first beam splitter to change a path thereof;

an objective lens for forming a fine focus of the light beam reflected by said reflection mirror on the optical disk;

a magnetic coil for generating a magnetic field based on a current flow therethrough to perform recording/erasing of information on the optical disk;

a focusing lens adjusting a focusing distance of the light beam reflected by said first beam splitter;

a second beam splitter for transmitting and reflecting the resultant light beam from said focusing lens;

first beam detection means for detecting the light beam reflected by said second beam splitter and converting the detected light beam into a first current signal;

second beam detection means for detecting the light beam transmitted by said second beam splitter and converting the detected light beam into a second current signal;

current/voltage conversion means for converting the first and second current signals from said first and second beam detection means into voltage signals;

low pass filtering means for filtering the voltage signals from said current/voltage conversion means to remove high frequency components therefrom;

data signal separation means for separating a feedback signal and data signals from the resultant voltage signals obtained from said low pass filtering means;

optical head control means for controlling an optical head driver in response to the feedback signal from said data signal separation means, said optical head driver driving an optical head under the control of said optical head control means;

signal processing means for processing the data signals from said data signal separation means; and interface means for transferring the processed signals from said signal processing means to a host system and said optical head control means and transferring instructions and control signals from said host system to said signal processing means, wherein said signal processing means includes:
  a pit separation switch for separating header information pits and data information pits from the data signals obtained from said data signal separation means and outputting the resultant analog header information signal or data information signal;
  a pulse detector for converting the analog header information signal or data information signal from said pit separation switch into a digital signal;
  a sector mark detector for detecting a sector mark from the digital header information signal from said pulse detector to output a sector mark detect signal;
  a phase compensator for compensating for a phase of the digital data information signal from said pulse detector for synchronization with the digital header information signal outputted from said sector mark detector; and
  a microcontroller for decoding the digital header information signal from said sector mark detector and the digital data information signal from said phase compensator and controlling said pit separation switch in response to the sector mark detect signal from said sector mark detector.

2. A method of measuring seek time using a magneto-optical disk apparatus, comprising the steps of:
  (a) allowing a host system to generate a seek instruction to measure the seek time required in shifting an optical head to a desired target track on a magneto-optical disk;
  (b) calculating instruction time before the seek instruction from said host system is transferred to the magneto-optical disk apparatus;
  (c) transferring the seek instruction from said host system to the magneto-optical disk apparatus after calculation of the instruction time;
  (d) driving a timer of said host system to start a counting operation of the timer and setting a count of the timer at that time as a seek start time;
  (e) outputting a digital optical head control signal to an optical head controller in the magneto-optical disk apparatus in response to the seek instruction from said host system for execution of a seek function of the optical head;
  (f) driving said optical head controller to convert the digital optical head control signal into an analog signal for driving an optical head driver in the magneto-optical disk apparatus;
  (g) driving said optical head driver in response to the analog signal from said optical head controller to shift the optical head to the target track on the magneto-optical disk;
  (h) reading a number of the shifted track on the optical disk after shifting the optical head to the target track and checking whether the read track number is the same as that of the target track;
  (i) continuing to drive said optical head controller to repeatedly perform an error correction operation until the optical head reaches accurately the target track;
  (j) checking whether the optical head reaches accurately the target track for a predetermined time period;
  (k) generating an interrupt signal to said timer in said host system to stop the counting operation of said timer if it is checked at said step (j) that the optical head reaches accurately the target track for the predetermined time period and setting a count of said timer at that time as a seek stop time;
  (l) obtaining the seek time by subtracting the seek start time set at said step (d), latency time per $\frac{1}{2}$ revolution of the magneto-optical disk and the instruction time calculated at said step (b) from the seek stop time set at said step (k); and
  (m) sending an error message code to said host system to notify said host system of a failure in the seek operation if it is checked at said step (j) that the optical head does not reach accurately the target track for the predetermined time period.

3. A method of measuring seek time using a magneto-optical disk apparatus, as set forth in claim 2, wherein said instruction time calculating step (b) includes the steps of:
  (b-1) allowing said host system to generate a sector mark search instruction;
  (b-2) clearing said timer of said host system to perform the counting operation at the moment that the sector mark search instruction is executed;

(b-3) separating header and data information pits from data signals from the magneto-optical disk after clearing said timer;

(b-4) converting the resultant analog header information and data information signals into digital signals, detecting a sector mark from the digital header information signal and outputting a sector mark detect signal;

(b-5) checking in response to the sector mark detect signal whether the sector mark is detected for the predetermined time period;

(b-6) generating an interrupt signal to said timer in said host system to stop the counting operation of said timer if it is checked at said step (b-5) that the sector mark is detected for the predetermined time period;

(b-7) setting a count of said timer stopped at said step (b-6) as the instruction time;

(b-8) clearing said timer to return to an initial state; and (b-9) sending the error message code to said host system if it is checked at said step (b-5) that the sector mark is not detected for the predetermined time period and ending the operation.

* * * * *